(12) United States Patent
Oyama et al.

(10) Patent No.: US 9,654,224 B2
(45) Date of Patent: May 16, 2017

(54) OPTICAL TRANSMISSION DEVICE, NONLINEAR DISTORTION COMPENSATION METHOD, AND NONLINEAR DISTORTION PRE-EQUALIZATION METHOD

(71) Applicant: FUJITSU LIMITED, Kawasaki-shi, Kanagawa (JP)

(72) Inventors: Tomofumi Oyama, Kawasaki (JP); Takahito Tanimura, Kawasaki (JP); Takeshi Hoshida, Kawasaki (JP); Hisao Nakashima, Kawasaki (JP); Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/828,605

(22) Filed: Aug. 18, 2015

(65) Prior Publication Data

US 2016/0065312 A1   Mar. 3, 2016

(30) Foreign Application Priority Data

Sep. 3, 2014   (JP) .................................. 2014-179614

(51) Int. Cl.
*H04B 10/2543* (2013.01)
*H04B 10/58* (2013.01)
(Continued)

(52) U.S. Cl.
CPC ......... *H04B 10/58* (2013.01); *H04B 10/2543* (2013.01); *H04B 10/25073* (2013.01);
(Continued)

(58) Field of Classification Search
CPC . H04B 10/2507–10/2572; H04B 10/58; H04B 10/6161–10/6973; H04B 2210/003–2210/258
(Continued)

(56) References Cited

U.S. PATENT DOCUMENTS 5,999,289 A * 12/1999 Ihara ................ H04B 10/25133
356/73.1
6,016,379 A * 1/2000 Bulow ............... H04B 10/2569
385/11
(Continued)

FOREIGN PATENT DOCUMENTS

CA          2705969 A1    12/2011
JP        2012-075097      4/2012

OTHER PUBLICATIONS

EESR—The Extended European Search Report issued for European Patent Application No. 15181957.0, dated Feb. 1, 2016.
(Continued)

*Primary Examiner* — Li Liu
(74) *Attorney, Agent, or Firm* — Fujitsu Patent Center

(57) ABSTRACT

An optical receiver includes a dividing unit, a control unit, and a compensating unit. The dividing unit divides an optical transmission signal into a plurality of frequency components by a set number of divisions and a set division bandwidth. The control unit controls the number of divisions and the division bandwidth on the basis of transmission path information about an optical transmission line through which the optical transmission signal is transmitted and signal information about the optical transmission signal. The compensating unit compensates optical nonlinear distortion of each of the frequency components divided by the dividing unit.

9 Claims, 15 Drawing Sheets

(51) Int. Cl.
*H04L 25/03* (2006.01)
*H04B 10/2507* (2013.01)
*H04B 10/61* (2013.01)
*H04B 10/69* (2013.01)

(52) U.S. Cl.
CPC ....... *H04B 10/616* (2013.01); *H04B 10/6163* (2013.01); *H04B 10/6971* (2013.01); *H04L 25/03343* (2013.01); *H04B 2210/252* (2013.01); *H04B 2210/254* (2013.01)

(58) Field of Classification Search
USPC ................. 398/158–162, 192–195, 208–213
See application file for complete search history.

(56) References Cited

U.S. PATENT DOCUMENTS

| | | | | |
|---|---|---|---|---|
| 6,487,254 B1* | 11/2002 | Goeddel | ................. | H04L 27/38 329/304 |
| 6,661,974 B1* | 12/2003 | Akiyama | ........... | H04B 10/2513 398/158 |
| 6,694,273 B2* | 2/2004 | Kurooka | ........... | H04B 10/2513 702/66 |
| 6,768,875 B1* | 7/2004 | Eiselt | ................ | H04B 10/2569 398/147 |
| 8,204,389 B2* | 6/2012 | Li | ...................... | H04B 10/2507 398/202 |
| 8,774,313 B2* | 7/2014 | Dou | ................... | H04B 10/2939 375/296 |
| 9,209,829 B2* | 12/2015 | Pagnanelli | ............ | H03M 3/468 |
| 2002/0021862 A1* | 2/2002 | Zhou | ........................ | H04J 14/02 385/24 |
| 2002/0041637 A1* | 4/2002 | Smart | ................. | H04L 27/2602 375/316 |
| 2002/0063934 A1* | 5/2002 | Sakauchi | ........... | H04B 10/2513 398/141 |
| 2002/0089724 A1* | 7/2002 | Nishimoto | ....... | H04B 10/25133 398/158 |
| 2002/0145787 A1* | 10/2002 | Shpantzer | .......... | H04B 10/2543 398/99 |
| 2003/0117693 A1* | 6/2003 | Nakamura | ......... | H04B 10/2916 359/334 |
| 2003/0185568 A1* | 10/2003 | Ooi | ................. | H04B 10/25133 398/81 |
| 2004/0001715 A1* | 1/2004 | Katagiri | ............. | H04B 10/2525 398/81 |
| 2004/0042557 A1* | 3/2004 | Kabel | ................ | H03H 17/0266 375/260 |
| 2004/0141749 A1* | 7/2004 | Otani | ............... | H04B 10/25133 398/83 |
| 2004/0213578 A1* | 10/2004 | Takahara | ........... | H04B 10/2513 398/147 |
| 2004/0264585 A1* | 12/2004 | Borran | .................. | H04L 5/0007 375/260 |
| 2005/0074205 A1* | 4/2005 | Tomita | ..................... | H04J 14/02 385/24 |
| 2005/0078964 A1* | 4/2005 | Takahara | ........... | H04B 10/2569 398/147 |
| 2005/0180760 A1* | 8/2005 | Feced | ................ | H04B 10/2575 398/183 |
| 2005/0271387 A1* | 12/2005 | Kee | .................... | H04B 10/2543 398/140 |
| 2006/0034614 A1* | 2/2006 | Chen | .................. | H04B 10/2569 398/149 |
| 2006/0263094 A1* | 11/2006 | Setti | .................... | H04B 10/2569 398/152 |
| 2007/0211786 A1* | 9/2007 | Shattil | .................... | H04B 1/707 375/141 |
| 2009/0127443 A1* | 5/2009 | Liu | .................. | H04B 10/07951 250/227.18 |
| 2009/0220239 A1* | 9/2009 | Armstrong | ........... | H04B 10/548 398/81 |
| 2009/0238578 A1* | 9/2009 | Taylor | .............. | H04B 10/25133 398/147 |
| 2010/0142951 A1* | 6/2010 | Armstrong | ............. | H04B 10/67 398/65 |
| 2010/0239260 A1* | 9/2010 | Oikawa | ........... | H04B 10/07953 398/81 |
| 2010/0239262 A1* | 9/2010 | Li | ...................... | H04B 10/2507 398/81 |
| 2010/0239270 A1* | 9/2010 | Li | ...................... | H04B 10/2507 398/208 |
| 2010/0247099 A1* | 9/2010 | Lowery | .............. | H04B 10/2543 398/79 |
| 2010/0296819 A1* | 11/2010 | Kahn | .................... | H04B 10/60 398/158 |
| 2015/0091745 A1* | 4/2015 | Pagnanelli | ............ | H03M 3/468 341/143 |

OTHER PUBLICATIONS

K. -P. Ho, "Subband equaliser for chromatic dispersion of optical fibre", Electronics Letters, vol. 45, No. 24, Nov. 19, 2009 (2 pages).

* cited by examiner

OPTICAL TRANSMISSION DEVICE, NONLINEAR DISTORTION COMPENSATION METHOD, AND NONLINEAR DISTORTION PRE-EQUALIZATION METHOD

CROSS-REFERENCE TO RELATED APPLICATION

This application is based upon and claims the benefit of priority of the prior Japanese Patent Application No. 2014-179614, filed on Sep. 3, 2014, the entire contents of which are incorporated herein by reference.

FIELD

The embodiments discussed herein are related to an optical transmission device, a nonlinear distortion compensation method, and a nonlinear distortion pre-equalization method.

BACKGROUND

In optical transmission devices that transmit optical transmission signals, for example, nonlinear distortion due to the nonlinear characteristics of optical fibers or optical transmission lines for amplifiers or the like disposed on optical fibers triggers degradation of the characteristics of optical transmission signals. Thus, in recent years, studies have been conducted on a technology that compensates the nonlinear characteristics of optical transmission lines by using digital signal processing.

FIG. 15 is a block diagram illustrating an example of a reception side digital signal processor (DSP) 100 in an optical receiver in an optical transmission device. The reception side DSP 100 is, for example, a digital signal processing circuit on the reception side embedded in an optical transmission device. The reception side DSP 100 includes a compensating unit 101, an adaptive equalizer (AEQ) 102, a frequency offset compensation unit (FOC) 103, and a carrier phase recovery unit (CPR) 104. The compensating unit 101 performs a compensating process of digital back propagation on reception signals. The compensating unit 101 includes a chromatic dispersion compensation unit (CDC) 101A and a nonlinear compensation unit (NLC) 101B.

The CDC 101A is, for example, a wavelength dispersion compensating unit that compensates wavelength dispersion of optical transmission signals generated in optical fibers. The NLC 101B is, for example, a nonlinear compensating unit that calculates nonlinear distortion generated in the amplitude of a reception signal in an optical fiber and that compensates the nonlinear distortion by subtracting the calculated nonlinear distortion from the reception signal.

The AEQ 102 is an adaptive equalizer that performs polarization division adaptively following a phenomenon, such as polarization fluctuation of a reception signal, time fluctuation of polarization mode dispersion, or the like. Furthermore, the AEQ 102 compensates residual dispersion of wavelength dispersion that is not able to be compensated by the CDC 101A and compensates a narrowed signal band generated in an electricity device, an optical device, or the like.

The FOC 103 is a frequency offset compensating unit that estimates a frequency offset that is a difference between the wavelength frequency of a light source on the transmission side and the wavelength frequency of a light source on the reception side and that compensates the frequency offset.

The CPR 104 is, for example, a carrier phase restoring unit that compensates phase noise of the light source or a variation component of a high-speed frequency offset that was not able to be compensated by the FOC 103.

The reception side DSP 100 performs electric conversion on the reception signal received from the optical fiber and inputs the reception signal to the CDC 101A. The CDC 101A compensates the wavelength dispersion inside the reception signal and input the compensated reception signal to the NLC 101B. The NLC 101B compensates nonlinear distortion of the reception signal and inputs the compensated reception signal to the AEQ 102. Furthermore, the compensating unit 101 uses digital back propagation and alternately repeats, in order to take into consideration a variation in waveform due to wavelength dispersion in the optical fiber as nonlinear compensation, wavelength dispersion compensation and nonlinear compensation until the nonlinear distortion is compensated.

The AEQ 102 performs polarization division on the reception signal, compensates residual dispersion of the reception signal or the narrowed signal band and inputs the compensated reception signal to the FOC 103. The FOC 103 estimates a frequency offset, compensates the estimated frequency offset, and inputs the compensated reception signal to the CPR 104. The CPR 104 compensates phase noise of the light source or a variation component of a frequency offset and outputs the compensated reception signal to a signal processing unit that is not illustrated.

The reception side DSP 100 alternately repeats, by using the compensating unit 101, wavelength dispersion compensation and nonlinear compensation until the nonlinear distortion is compensated and thus the reception side DSP 100 can compensate wavelength dispersion and nonlinear distortion of the reception signal.

Patent Document 1: Japanese Laid-open Patent Publication No. 2012-75097

However, in the compensating unit 101 in the optical transmission device, if the signal band width of an optical transmission signal is increased, an amount of the wavelength dispersion to be considered for the nonlinear compensation is increased, which results in an increase in an number of processing steps in which wavelength dispersion compensation and nonlinear compensation are alternately repeated by digital back propagation. Consequently, in the compensating unit 101, as the number of processing steps is increased, calculation of the nonlinear characteristics is more complicated and thus the size of the processing circuit is increased.

SUMMARY

According to an aspect of the embodiments, an optical transmission device includes: a dividing unit, a control unit and a compensating unit. The dividing unit divides an optical transmission signal into a plurality of frequency components by a set number of frequency divisions and a set division bandwidth. The control unit controls the number of frequency divisions and the division bandwidth on the basis of transmission path information about a transmission path through which the optical transmission signal is transmitted and signal information about the optical transmission signal. The compensating unit compensates optical nonlinear distortion of each of the frequency components divided by the dividing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The disclosed technology is not limited to the embodiments. Furthermore, the embodiments described below can be appropriately used in combination as long as they do not conflict with each other.

[a] First Embodiment

Figure 1:
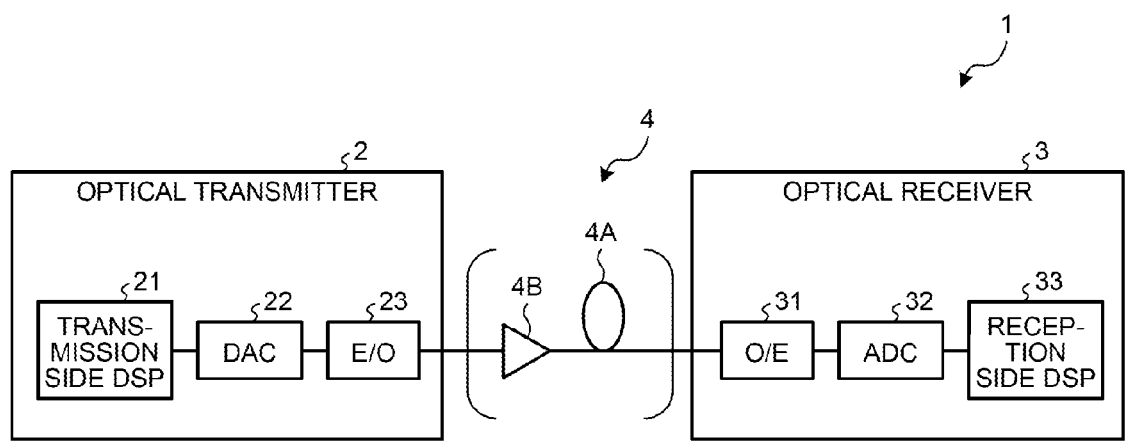
FIG. 1 is a block diagram illustrating an example of an optical transmission system according to a first embodiment.
Figure 2:
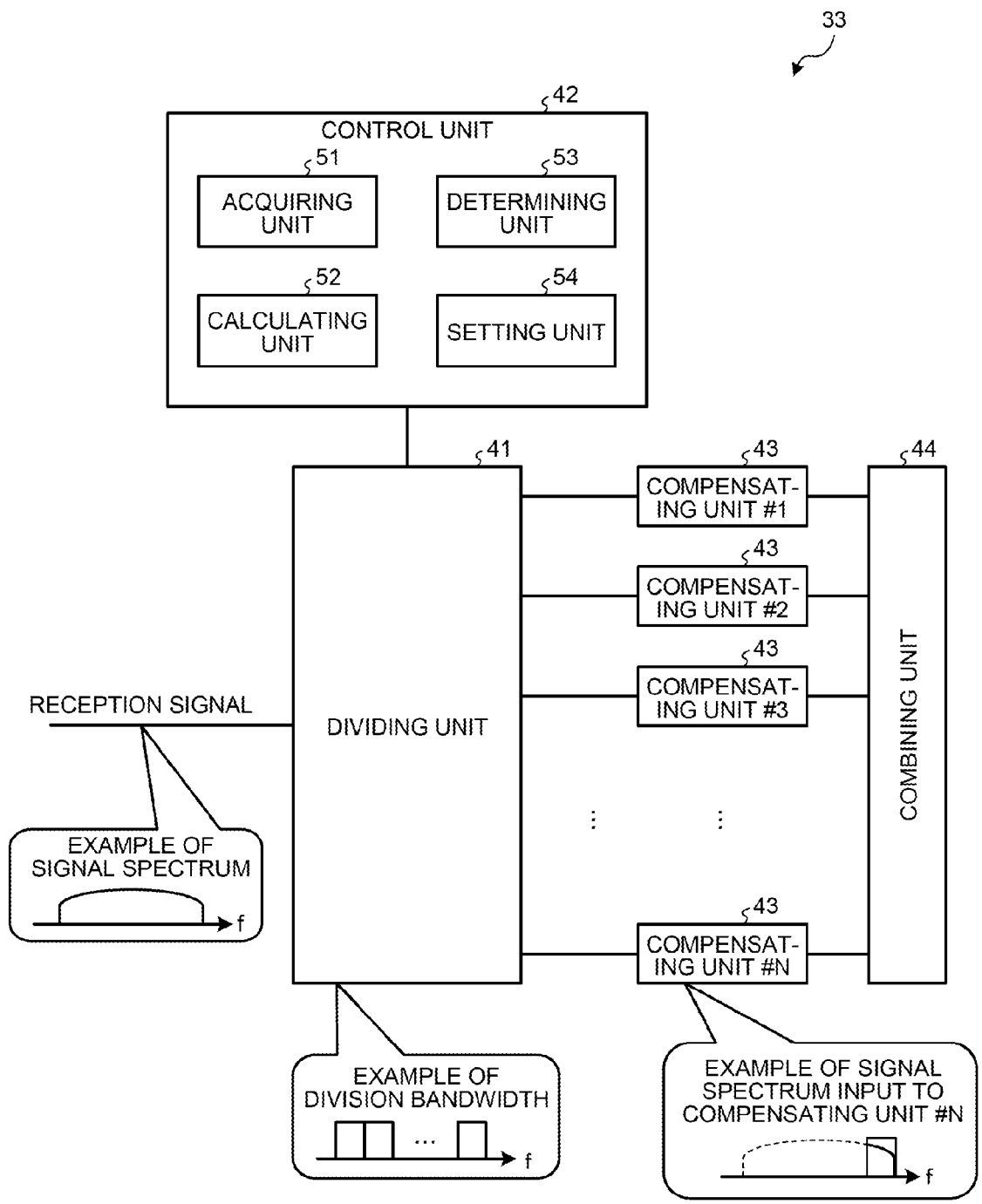
FIG. 2 is a block diagram illustrating an example of a reception side DSP in an optical receiver according to the first embodiment.

FIG. 1 is a block diagram illustrating an example of an optical transmission system according to a first embodiment. An optical transmission system 1 illustrated in FIG. 1 includes an optical transmitter 2 in an optical transmission device, an optical receiver 3 in an optical transmission device on an opposite side, and an optical transmission line 4 that transmits optical transmission signals between the optical transmitter 2 and the optical receiver 3. Furthermore, it goes without saying that each of the optical transmission devices includes therein the optical transmitter 2 and the optical receiver 3.

The optical transmission line 4 includes an optical fiber 4A and an optical device 4B, such as an optical amplifier or the like. Furthermore, the optical transmission line 4 binds, for example, the optical fiber 4A having a length of 100 km and disposes the optical device 4B at each binding point. A transmission method of, for example, a super channel method that transmits optical transmission signals is used as an example of the optical transmission system 1.

The optical transmitter 2 includes a transmission side DSP 21, a digital-to-analog converter (DAC) 22, and an electrical/optical converter (E/O) 23. The transmission side DSP 21 generates a transmission signal from an input signal. The DAC 22 performs analog conversion on a transmission signal that is an output signal of the transmission side DSP 21. The E/O 23 performs electric-optic conversion on the transmission signal that has been subjected to the analog conversion and transmits the transmission signal to the optical transmission line 4 as an optical transmission signal.

The optical receiver 3 includes an optical/electrical converter (O/E) 31, an analog-to-digital converter (ADC) 32, and a reception side DSP 33. The O/E 31 performs electric conversion on a reception signal that is the optical transmission signal received from the optical transmission line 4 and inputs the reception signal to the ADC 32. The ADC 32 performs digital conversion on the reception signal and transmits the reception signal that has been subjected to the digital conversion to the reception side DSP 33. The reception side DSP 33 divides the reception signal that has been subjected to the digital conversion into frequency components and compensates nonlinear distortion generated from the digital signal processing with respect to each of the frequency components.

The reception side DSP 33 includes a dividing unit 41, a control unit 42, compensating units 43, and a combining unit 44. The dividing unit 41 is constituted of a band-pass filter (BPF) or the like that is formed in an array with the number of divisions of, for example, N and that divides the reception signal into a plurality of frequency components on the basis of the set number of divisions N and a set division bandwidth Bdiv, which will be described later. The control unit 42 controls the number of divisions N and the division bandwidth Bdiv of the dividing unit 41.

The control unit 42 includes an acquiring unit 51, a calculating unit 52, a determining unit 53, and a setting unit 54. The acquiring unit 51 acquires, for example, transmission path information and signal information from a management device that is not illustrated. The transmission path information corresponds to setting information about the optical transmission line 4 and includes, for example, a dispersion coefficient D, a dispersion coefficient DDCF, a loss coefficient $\alpha$, a fiber length L, a fiber length LDCF, the number of spans Ns, a dispersion compensation ratio $\rho$, a light velocity c in a vacuum, and a light wavelength $\lambda$. The dispersion coefficient D is the dispersion coefficient of the optical fiber 4A. The dispersion coefficient DDCF is the dispersion coefficient of the dispersion compensation fiber. The loss coefficient $\alpha$ is the loss coefficient of the optical fiber 4A. The fiber length L is the length of the optical fiber 4A corresponding to a single span of the optical transmission line 4. The fiber length LDCF is the length of the dispersion compensation fiber corresponding to a single span of the optical transmission line 4. The number of spans Ns is the number of spans of the optical transmission line 4. The light wavelength $\lambda$ is the light wavelength to be considered.

The signal information corresponds to setting information about a transmission signal and includes, for example, a reception bandwidth B, a symbol rate, a pulse form, the number of reception channels M, a communication band of each of the reception channel, or the like. The reception bandwidth is a signal band of a reception signal. The symbol rate is a modulation rate of a symbol in the reception signal.

The pulse form is, for example, return to zero (RZ), non return to zero (NRZ), a Nyquist pulse, or the like, that is used for the reception signal. The number of reception channels M is the number of channels in the reception signal. The communication band is a communication band of each of the reception channels in the reception signal.

The calculating unit 52 calculates, on the basis of the transmission path information, the four-wave mixing (FWM) efficiency η of the reception signal. The FWM efficiency η between the frequency components that have a frequency difference Δf in the optical fiber 4A with the fiber length of L and the number of spans of Ns by using Equation (1), Equation (2), Equation (3), and Equation (4). Furthermore, the transmission path is assumed to be a path in which dispersion compensation can be performed at a constant rate in a dispersion compensation fiber with the distance LDCF for each span.

$$\eta = \frac{\alpha^2}{\alpha^2 + \Delta\beta^2}\left\{1 + \frac{4\exp(-\alpha L)\sin^2(\Delta\beta L/2)}{(1-\exp(-\alpha L))^2}\right\}\frac{\sin^2(N_S \Delta\tilde{\beta}/2)}{\sin^2(\Delta\tilde{\beta}/2)} \quad (1)$$

$$\Delta\beta = \frac{2\pi\lambda^2}{c}\Delta f^2 D \quad (2)$$

$$\Delta\tilde{\beta} = \frac{2\pi\lambda^2}{c}\Delta f^2 D_r \quad (3)$$

$$D_r = DL + D_{DCF}L_{DCF} = DL(1-p) \quad (4)$$

Figure 3:
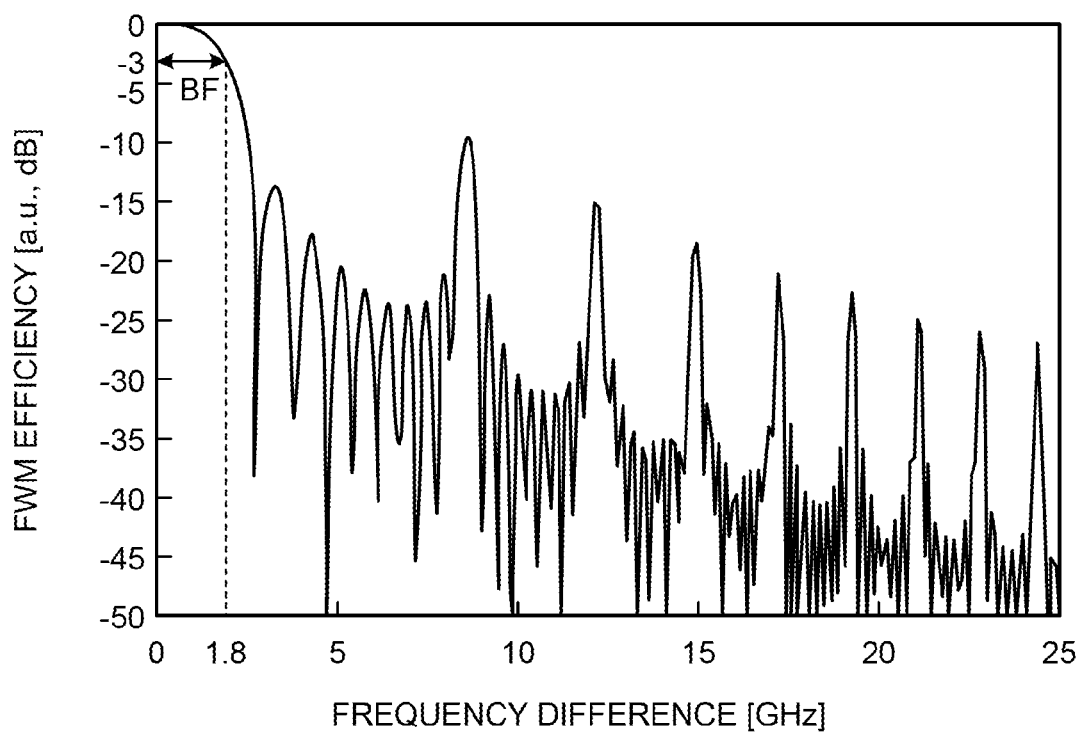
FIG. 3 is a diagram illustrating the relationship between the FWM efficiency and the frequency difference related to a reception signal.

FIG. 3 is a diagram illustrating the relationship between the FWM efficiency and the frequency difference related to a reception signal. In the example illustrated in FIG. 3, it is assumed that the optical fiber 4A with single mode of 100 km×10 span free from dispersion compensation. The FWM efficiency η illustrated in FIG. 3 is decreased as the efficiency deviates from the frequency of the reference signal. The frequency band of the current optical transmission signal is about, for example, 30 GHz. The range in which the FWM efficiency η is high, e.g., the range in which a frequency difference between the FWM components is equal to or greater than −3 dB, is about, for example, 1.8 GHz bands. Accordingly, even if frequency components of about 1.8 GHz bands are extracted from the reception signal, for the nonlinear distortion of the extracted frequency components, the nonlinear distortion generated in the frequency components is dominant.

After calculating the FWM efficiency η, the calculating unit 52 calculates, from the FWM efficiency η, a FWM band BF on the basis of the range of the frequency difference between the FWM components that are to be taken into consideration in the nonlinear compensation (FWM efficiency is equal to or greater than −X dB). As illustrated in FIG. 3, the range of the frequency difference between the FWM components corresponds to the range of the frequency difference in which the FWM efficiency η is equal to or greater than −3 dB and 1.8 GHz corresponds to the FWM band BF as the frequency difference associated with that range. Furthermore, "−X dB" is set on the optical transmission system 1 side. Then, the calculating unit 52 doubles the FWM band BF and calculates a minimum division bandwidth Bmin.

The determining unit 53 divides the reception bandwidth B by the minimum division bandwidth Bmin and determines a value obtained by rounding up after the decimal point of the divided value (B/Bmin) as the number of divisions N. Furthermore, the determining unit 53 divides the reception bandwidth B by the number of divisions N and determines the divided value B/N as the division bandwidth Bdiv.

The setting unit 54 sets, in the dividing unit 41, the number of divisions N and the division bandwidth Bdiv that are determined by the determining unit 53. Namely, the setting unit 54 sets, in the dividing unit 41 from the reception signal on the basis of the number of divisions N and the division bandwidth Bdiv, the center frequency and a passband of each of the frequency components. The dividing unit 41 divides the reception signal into the frequency components on the basis of the center frequency and the passband of each of the frequency components.

The compensating units 43 compensate the nonlinear distortion of each of the frequency components divided into frequency divisions by the dividing unit 41. The compensating units 43 use a compensating process of, for example, digital back propagation and repeatedly perform wavelength dispersion compensation and a nonlinear compensating process on the frequency components until the nonlinear distortion is compensated. Furthermore, because the frequency band of the frequency components is narrow compared with that of the reception signal and an amount of wavelength dispersion targeted for the compensation is decreased, the number of steps of processes repeatedly performed for the wavelength dispersion compensation and the nonlinear compensation is decreased. Furthermore, the combining unit 44 combines the frequency components compensated by each of the compensating units 43 and outputs the frequency components as the combined reception signal.

Figure 4:
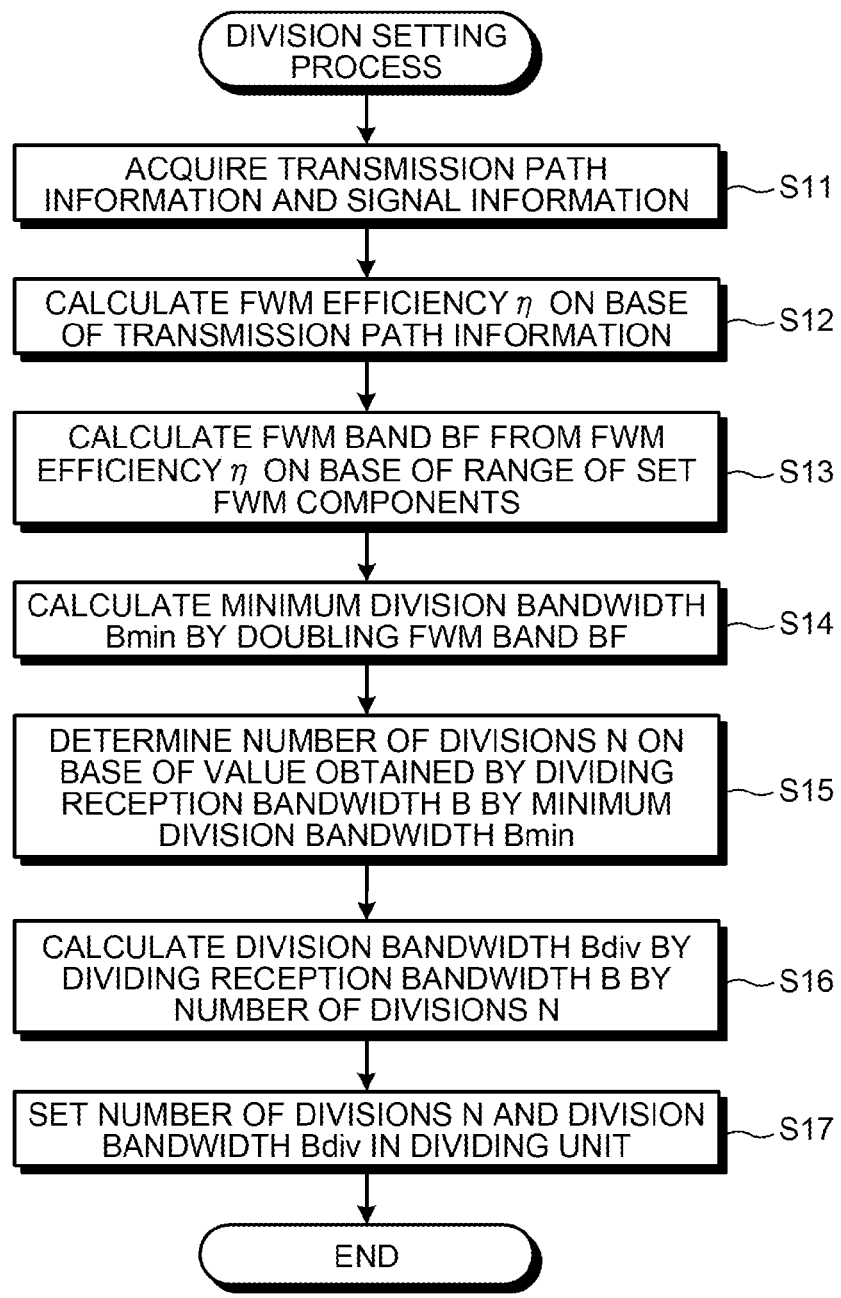
FIG. 4 is a flowchart illustrating an example of the operation of a process performed by a control unit in the reception side DSP related to a division setting process.

In the following, an operation of the optical transmission system 1 according to the first embodiment will be described. FIG. 4 is a flowchart illustrating an example of the operation of a process performed by the control unit 42 in the reception side DSP 33 related to a division setting process. The acquiring unit 51 in the control unit 42 in the reception side DSP 33 illustrated in FIG. 4 acquires transmission path information and signal information from a management unit that is not illustrated (Step S11). The calculating unit 52 in the control unit 42 calculates, on the basis of the transmission path information, the FWM efficiency η of the reception signal (Step S12).

The calculating unit 52 calculates, from the FWM efficiency η, the FWM band BF that corresponds to the frequency difference between the FWM components with the set −X dB or more (Step S13). The calculating unit 52 doubles the FWM band BF and calculates a minimum division bandwidth Bmin (Step S14).

Furthermore, the determining unit 53 in the control unit 42 acquires the reception bandwidth B of the reception signal from the signal information and determines, as the number of divisions N, a value obtained by rounding up after the decimal point of the divided value (B/Bmin) that is obtained by dividing the acquired reception bandwidth B by the minimum division bandwidth Bmin (Step S15). The determining unit 53 determines the value (B/N) obtained by dividing the reception bandwidth B by the number of divisions N as the division bandwidth Bdiv (Step S16).

Furthermore, the setting unit 54 in the control unit 42 sets the determined number of divisions N and the division bandwidth Bdiv in a dividing unit 25 (Step S17) and ends the operation of the process illustrated in FIG. 4. Consequently, the dividing unit 41 sets the number of divisions N, the center frequency of the frequency components of the division bandwidth Bdiv, and the passband in each of the BPFs.

The control unit 42 that performs the division setting process illustrated in FIG. 4 calculates the FWM efficiency η of the reception signal on the basis of the transmission path information; determines the number of divisions N on the basis of the FWM efficiency η and the reception bandwidth B of the reception signal; and determines the division bandwidth Bdiv on the basis of the reception bandwidth B thereof and the number of divisions N. Furthermore, the control unit 42 sets the determined number of divisions N and the division bandwidth Bdiv in the dividing unit 41. The dividing unit 41 divides, by using the set number of divisions N and the set division bandwidth Bdiv, the reception signal into frequency components with N divisions. Consequently, because the bandwidth of each of the frequency components in the reception signal becomes narrow, the amount of the wavelength dispersion to be considered is accordingly decreased.

Then, the dividing unit 41 divides, on the basis of the set division bandwidth Bdiv and the number of divisions N, the reception signal into frequency components with N divisions and inputs each of the frequency components to one of the associated compensating units 43. Consequently, because the bandwidth of the reception signal treated by the compensating units 43 becomes narrow, the amount of the wavelength dispersion to be considered in the frequency components is accordingly decreased. Furthermore, each of the compensating units 43 compensates the nonlinear distortion of the input frequency components. Consequently, because the amount of the wavelength dispersion of the frequency components is decreased and the number of processing steps in the digital back propagation is accordingly decreased, the compensating unit 43 can reduce the size of the processing circuit while compensating the nonlinear distortion due to the nonlinear characteristics of the optical transmission line 4.

Then, by performing the wavelength dispersion compensation and the nonlinear compensation on the input frequency components, each of the compensating units 43 compensates the linear characteristics and the nonlinear characteristics of the frequency components and then inputs the compensated frequency components to the combining unit 44. The combining unit 44 combines the compensated frequency components of each of the compensating units 43 and outputs the combined frequency component.

In the first embodiment, on the basis of the transmission path information and the signal information, the number of divisions N and the division bandwidth Bdiv of the reception signal are calculated and the calculated number of divisions N and the division bandwidth Bdiv are set in the dividing unit 41. The dividing unit 41 divides, on the basis of the set number of divisions N and the set division bandwidth Bdiv, the reception signal into frequency components with N divisions and inputs each of the frequency components in each of the compensating units 43. Consequently, because each of the compensating units 43 sets the frequency components obtained by dividing the reception signal as the compensation target, the amount of the wavelength dispersion of that frequency components is reduced and the number of processing steps in the digital back propagation is accordingly reduced; therefore, the size of the processing circuit can be reduced.

Originally, dispersion compensation can reduce the size of the circuit if the handling band of a signal is divided and a compensating process is performed; however, nonlinear distortion is not able to be compensated if the signal is divided into too small pieces. Thus, in order to control the bandwidth of the reception signal that is to be divided by the dividing unit 41 by taking into consideration both the transmission path information and the signal information, the size of the circuit can be reduced while nonlinear distortion is compensated.

Furthermore, in the first embodiment described above, a description has been given of a case of the reception side DSP 33 that divides the reception signal into frequency components with N divisions and performs the nonlinear compensation process for each frequency component. However, the embodiment may also be applied to the transmission side DSP 21 that divides the transmission signal into frequency components with N divisions and that generates a transmission signal that performs the nonlinear compensation for each frequency component.

Furthermore, the dividing unit 41 and the compensating unit 43 according to the first embodiment described above may also be specifically configured as follows and an embodiment of this case will be described below as a second embodiment.

[b] Second Embodiment

Figure 5:
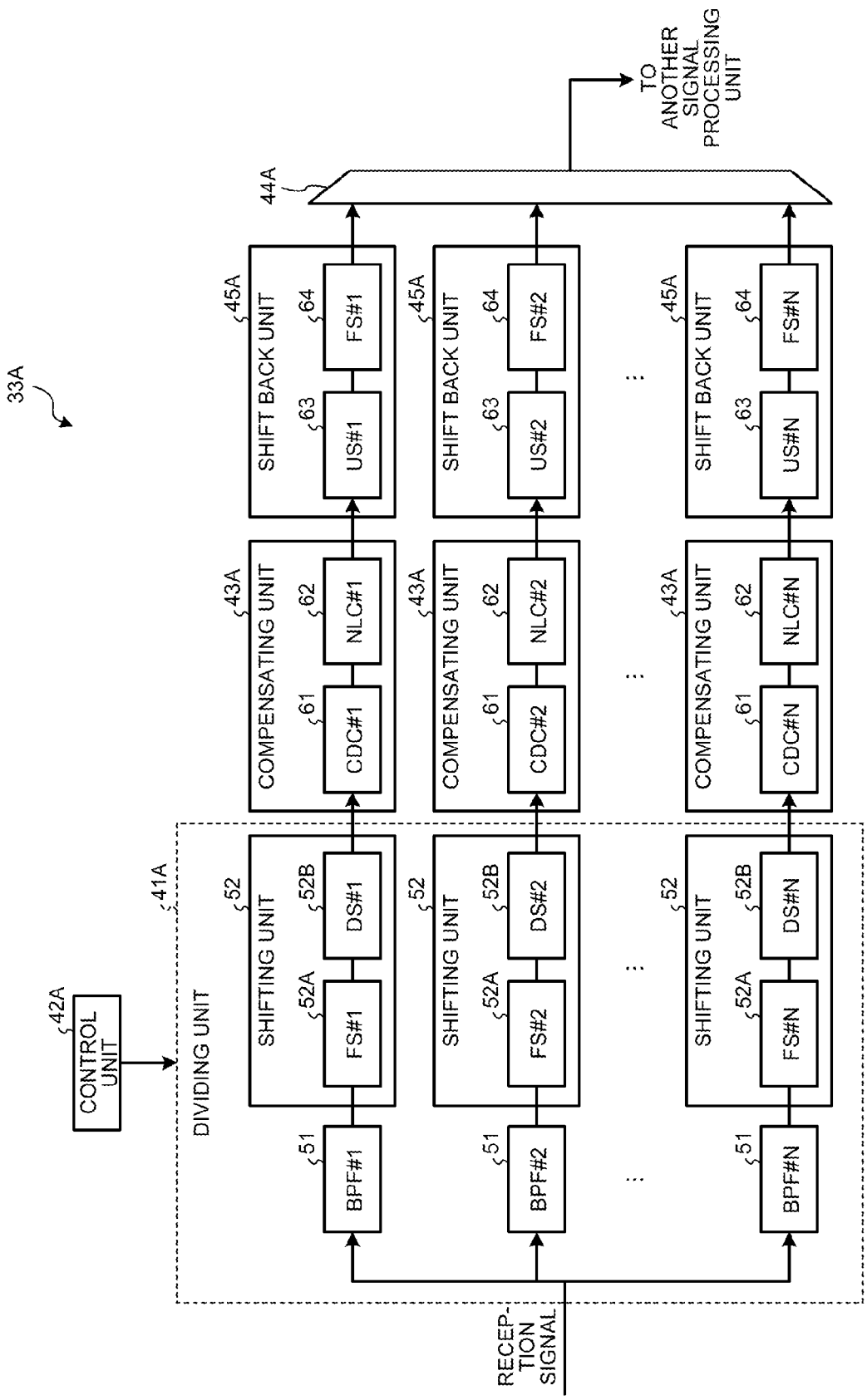
FIG. 5 is a block diagram illustrating an example of a reception side DSP according to a second embodiment.

FIG. 5 is a block diagram illustrating an example of a reception side DSP 33A according to the second embodiment. By assigning the same reference numerals to components having the same configuration as those in the optical transmission system 1 according to the first embodiment, descriptions thereof will be omitted.

The reception side DSP 33A illustrated in FIG. 5 includes a dividing unit 41A, a control unit 42A, N (#1 to #N) compensating units 43A, N (#1 to #N) shift back units 45A, and a combining unit 44A. It is assumed that the number of divisions is N. The dividing unit 41A includes N (#1 to #N) band pass filters (BPF) 51 and N (#1 to #N) shifting units 52. Each of the shifting units 52 includes a frequency shift unit (FS) 52A and a down sampling unit (DS) 52B.

On the basis of the set number of divisions N and the set division bandwidth Bdiv, the dividing unit 41A sets, in each of the BPFs 51, the center frequency and the passband of the frequency component associated with the number of divisions N and the division bandwidth Bdiv. Each of the BPFs 51 is a band pass filter that extracts, from the reception signal, the associated frequency component. The FS 52A is a frequency shifting unit that shifts the frequency such that the center frequency of the frequency components corresponding to an output of the associated BPF 51 becomes 0 Hz. Each of the DSs 52B is a down sampling unit that performs a down sampling process that decimates the sampling rate of the frequency components in which the frequency of the associated FS 52A has been shifted.

Each of the compensating units 43A associated with one of the DSs 52B is digital back-propagation (DBP) that performs a compensating process in the digital back propagation on the frequency components in which the frequency has been shifted. Each of the compensating units 43A includes a CDC 61 and an NLC 62. The CDC 61 compensates the wavelength dispersion of frequency components. The NLC 62 compensates the nonlinear distortion of the frequency components that have been subjected to the wavelength dispersion compensation.

Each of the shift back units 45A associated with one of the compensating units 43A restores the center frequency of the compensated frequency components to the previous frequency before the shift performed in the shifting unit 52. Each of the shift back units 45A includes an up sampling unit (US) 63 and an FS 64. Each of the USs 63 is an up sampling unit that performs an up sampling process that restores the sampling rate of the compensated frequency components of the NLC 62 in the compensating unit 43A to the rate before the process performed in the DS 52B. Each of the FSs 64 restores the center frequency of the frequency components of the associated US 63 to the frequency before the frequency shift performed in the FS 52A. The combining unit 44A combines the frequency components from each of the shift back units 45A and outputs a combined reception signal.

The setting unit 54 in the control unit 42A in the reception side DSP 33A sets, in each of the BPFs 51 on the basis of the determined number of divisions N and the determined division bandwidth Bdiv, the center frequency and the passband of the frequency components that are to be divided from the reception signal.

In the following, an operation of the reception side DSP 33A according to the second embodiment will be described. The control unit 42A in the reception side DSP 33A sets, in each of the BPFs 51 on the basis of the determined number of divisions N and the determined division bandwidth Bdiv, the center frequency and the passband of each of the frequency components obtained by dividing the reception signal.

The dividing unit 41A branches the reception signal into each of the BPFs 51. Each of the BPFs 51 divides, on the basis of the set center frequency and the passband, the reception signal into frequency components. Furthermore, the shifting unit 52 associated with the BPF 51 shifts the center frequency of the frequency components via the FS 52A to 0 Hz and performs down sampling on the frequency components that have been subjected to frequency shift via the DS 52B.

Furthermore, each of the compensating units 43A associated with one of the DSs 52B compensates, via the associated CDC 61, the wavelength dispersion of the frequency component that has been subjected to the down sampling. Furthermore, each of the compensating units 43A compensates, via the associated NLC 62, the nonlinear distortion of the frequency component that has been subjected to the wavelength dispersion compensation. Then, the compensating unit 43A repeats the wavelength dispersion compensation performed in the CDC 61 and the nonlinear compensation performed in the NLC 62 until the nonlinear distortion of the frequency component has been compensated.

Then, the shift back unit 45A associated with the compensating unit 43A inputs the frequency components that have been subjected to the nonlinear compensation performed in the compensating unit 43A and restores, via the US 63, the frequency component to the previous sampling rate before the process performed in the DS 52B. Furthermore, the shift back unit 45A restores, via the FS 64, the center frequency of the frequency components to the center frequency before the process performed in the FS 52A.

Then, each of the shift back units 45A inputs, to the combining unit 44A, the frequency component after the nonlinear compensation after the shift back. The combining unit 44A inputs each of the frequency components from each of the #1 to #N shift back units 45A; combines all of the frequency components; generates a combined reception signal; and outputs the signal to the other signal processing unit. Consequently, the reception side DSP 33A can output the reception signal that has been subjected to the nonlinear compensation in which the nonlinear distortion of the optical transmission line 4 has been compensated.

The reception side DSP 33A according to the second embodiment described above divides, in each of the BPFs 51 in each of which the number of divisions N and the division bandwidth Bdiv are set, the reception signal into frequency components with N divisions and performs the compensating process that uses the digital back propagation on the divided frequency components. Consequently, because the compensating unit 43A uses the frequency components obtained by dividing the reception signal into N divisions as the target for the compensation, the amount of the wavelength dispersion of the frequency components is decreased and the number of processing steps in the digital back propagation is accordingly reduced; therefore, the size of the processing circuit can be reduced.

Furthermore, because the combining unit 44A combines the compensated frequency components received from each of the compensating unit 43A and outputs the combined frequency component, the combining unit 44A can output the reception signal that has been subjected to the nonlinear compensation.

Furthermore, the compensating unit 43A performs the nonlinear compensating process on the frequency components that have been subjected to the down sampling process in the DS 52B in the previous step. Consequently, because the sampling rate is decimated, the size of the processing circuit becomes small.

Furthermore, in the reception side DSP 33A according to the second embodiment described above, a description has been given of a case in which the reception signal in a single channel is input; however, the embodiment can be used when the reception signal including a plurality of channels is input and an embodiment of this case will be described below as a third embodiment.

[c] Third Embodiment

Figure 6:
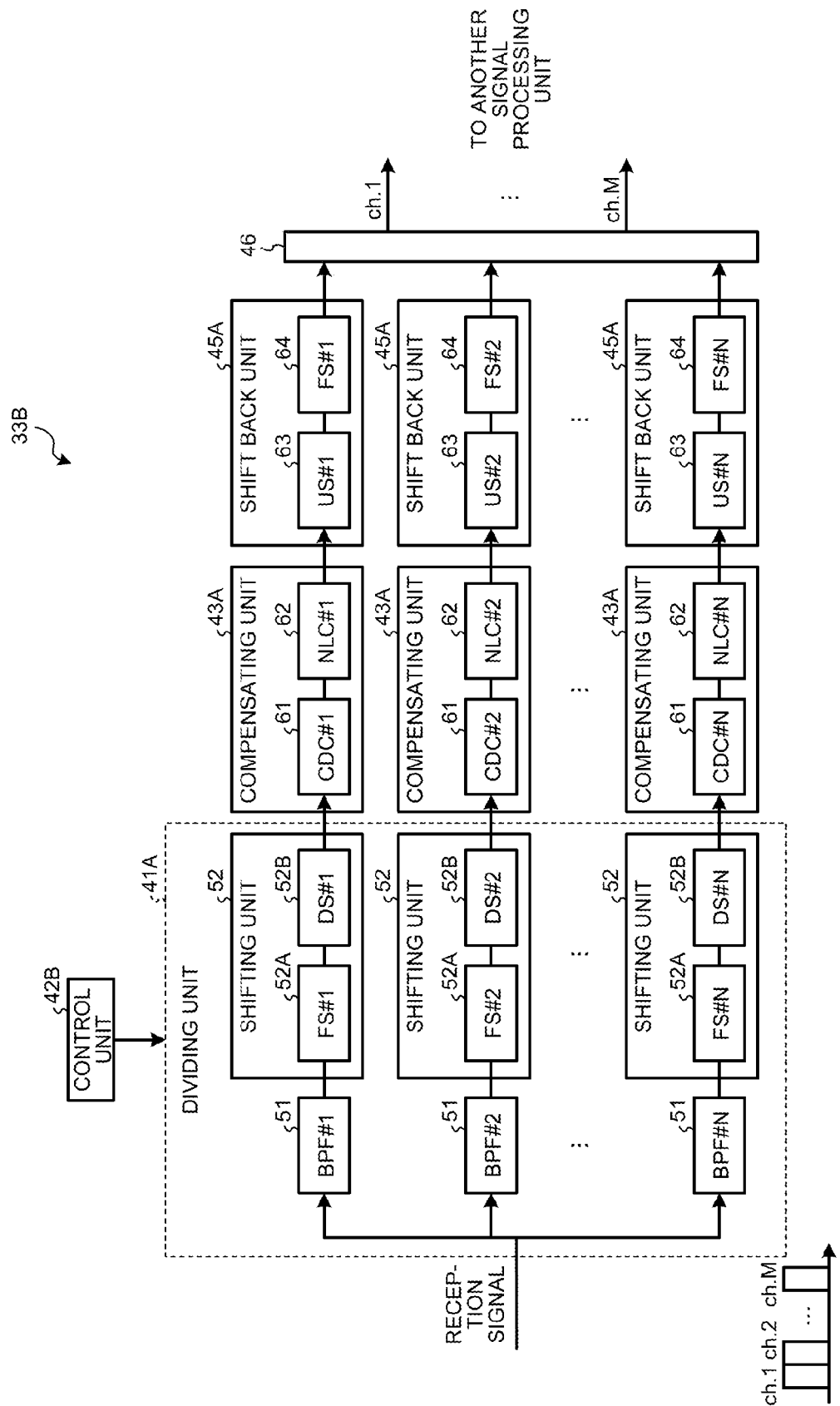
FIG. 6 is a block diagram illustrating an example of a reception side DSP according to a third embodiment.

FIG. 6 is a block diagram illustrating an example of a reception side DSP according to a third embodiment. By assigning the same reference numerals to components having the same configuration as those in the reception side DSP 33A illustrated in FIG. 5, descriptions thereof will be omitted.

A reception side DSP 33B illustrated in FIG. 6 differs from the reception side DSP 33A illustrated in FIG. 5 in that a reception signal including a plurality of channels is divided, as the target, by the dividing unit. The reception side DSP 33B differs from the reception side DSP 33A in that, the reception side DSP 33B includes, instead of the combining unit 44A, a combination separating unit 46 that generates a combined reception signal by combining the frequency components subjected to nonlinear compensation received from the shift back units 45A, that separates channel signals in units of channels from the combined reception signal, and that outputs the separated channel signal.

In the following, an operation of the reception side DSP 33B according to the third embodiment will be described. A control unit 42B in the reception side DSP 33B determines, on the basis of the transmission path information and the signal information, the number of divisions N and the division bandwidth Bdiv. The control unit 42B sets, in each of the BPFs 51 in the dividing unit 41A on the basis of the determined number of divisions N and the determined division bandwidth Bdiv, the center frequency and a passband of the frequency components. The dividing unit 41A divides the reception signal into frequency components by using the BPFs 51 with N divisions and inputs, to each of the compensating units 43A, the frequency components that have been subjected to the frequency shift performed by each of the shifting units 52.

Each of the compensating units 43A repeatedly performs the wavelength distributed processing and the nonlinear compensating process on the frequency components that have been subjected to the frequency shift until the nonlinear distortion has been compensated. Then, each of the compensating units 43A inputs the frequency components subjected to the nonlinear compensation to the shift back unit 45A. Furthermore, each of the shift back units 45A restores the center frequency of the frequency components subjected to the nonlinear compensation to that before the frequency shift is performed and then inputs the frequency components to the combination separating unit 46.

The combination separating unit 46 generates a combined reception signal by combining the compensated frequency components received from each of the shift back units 45A. Furthermore, the combination separating unit 46 separates the generated combined reception signal into units of channels and then outputs each of the channel signals to another signal processing unit.

The reception side DSP 33B according to the third embodiment described above divides, on the basis of the set number of divisions N and the set division bandwidth Bdiv, the reception signal including a plurality of channels into a plurality of frequency components and compensates nonlinear distortion for each frequency component. Consequently, because the compensating unit 43A uses, as the target for the compensation, the frequency components obtained by dividing the reception signal including the channels into N divisions, the amount of the wavelength dispersion of the frequency components is decreased and the number of processing steps in the digital back propagation is accordingly reduced; therefore, the size of the processing circuit can be reduced.

Furthermore, the reception side DSP 33B generates a combined reception signal by combining the frequency components that have been subjected to the nonlinear compensation and outputs, in a separated manner, the combined reception signal in units of channels. Consequently, the reception side DSP 33B can output a desired channel from the reception signal that has been subjected to the nonlinear compensation.

Furthermore, in the third embodiment described above, the reception signal including the plurality of channels are divided into N frequency components by the BPF 51 associated with the number of divisions N and the division bandwidth Bdiv. However, it may be possible to determine the number of divisions and the division bandwidth by taking into consideration both the number of reception channels and the communication band of the reception channel and divide, on the basis of the number of divisions and the band division bandwidth, the reception signals into frequency components in units of channels. An embodiment of this case will be described below as a fourth embodiment.

[d] Fourth Embodiment

Figure 7:
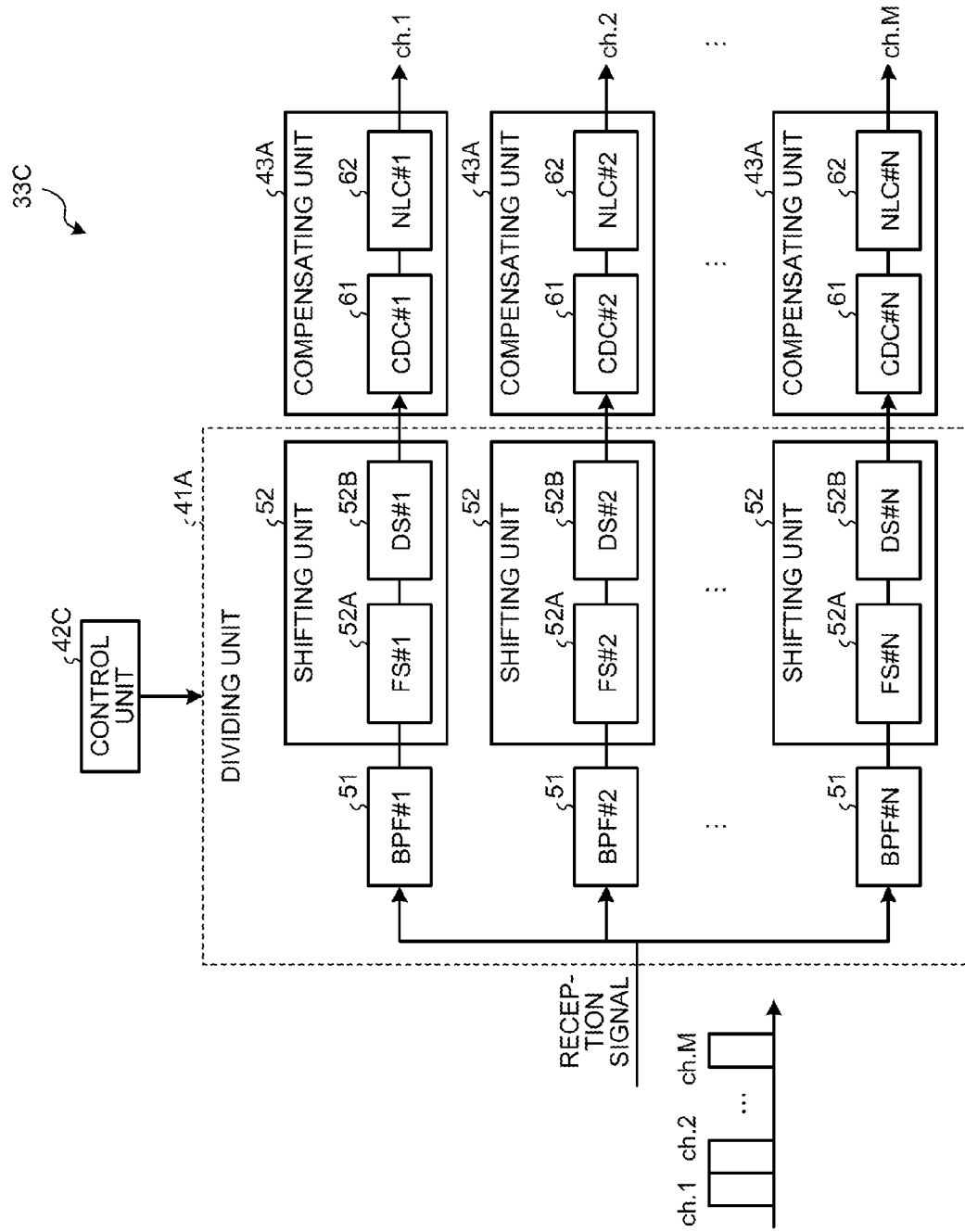
FIG. 7 is a block diagram illustrating an example of a reception side DSP according to a fourth embodiment.

FIG. 7 is a block diagram illustrating an example of a reception side DSP 33C according to a fourth embodiment. By assigning the same reference numerals to components having the same configuration as those in the reception side DSP 33B illustrated in FIG. 6, descriptions thereof will be omitted.

The reception side DSP 33C differs from the reception side DSP 33B in that the number of reception channels M of reception signals is set as the number of divisions N, the communication band of the reception channels is set as the division bandwidth Bdiv, and, on the basis of the number of divisions N and the division bandwidth Bdiv, the reception signals are divided in units of channels. Furthermore, the reception side DSP 33C differs from the reception side DSP 33B in that the reception side DSP 33C does not include the shift back unit 45A and the combination separating unit 46.

A control unit 42C determines that the number of reception channels M of reception signals is set as the number of divisions N and determines that the communication band of the reception channels of the reception signals is set as the division bandwidth Bdiv. The control unit 42C sets, in each of the BPFs 51 in the dividing unit 41A on the basis of the number of divisions N and the division bandwidth Bdiv, the center frequency and the passband of the frequency components in units of channels. Furthermore, because the control unit 42C determines that the number of reception channels M acquired from the signal information is set as the number of divisions N and determines that the frequency interval of the channels acquired from the signal information is set as the division bandwidth Bdiv, there is no need to calculate the FWM efficiency performed in the first embodiment.

The dividing unit 41A divides, in the BPFs 51 in units of channels, the reception signal into frequency components in units of channels and shifts, in the shifting unit 52, the center frequency of the frequency components to 0 Hz. Furthermore, each of the compensating units 43A associated with one of the BPFs 51 repeatedly performs the wavelength dispersion compensation and the nonlinear compensation on the frequency components subjected to the frequency shift until the nonlinear distortion has been compensated. Then, each of the compensating units 43A outputs, to the other signal processing unit as channel signals, the frequency components subjected to the nonlinear compensation.

The reception side DSP 33C in the fourth embodiment sets the number of reception channels M acquired form the signal information as the number of divisions N, sets the communication band of the reception channels acquired form the signal information as the division bandwidth Bdiv, and divides, on the basis of the number of divisions N and the division bandwidth Bdiv, the reception signal into frequency components in units of channels. The reception side DSP 33C compensates nonlinear distortion for each frequency component in units of channels. Consequently, because the compensating unit 43A uses the frequency components in units of channels obtained by dividing reception signals including a plurality of channels into units of channels, the amount of the wavelength dispersion of the frequency components is decreased and the number of processing steps in the digital back propagation is accordingly reduced; therefore, the size of the processing circuit can be reduced.

Furthermore, the reception side DSP 33C performs nonlinear compensation on the frequency components and outputs, in units of channels, the frequency components that have been subjected to the nonlinear compensation. Consequently, the reception side DSP 33C does not need the process of combining and separating the frequency components performed by the combination separating unit 46 illustrated in FIG. 6 and can output the frequency components that have been subjected to the nonlinear compensation in units of channels. Namely, it is possible to suppress the degradation of channel signals due to division and integration of frequency components.

Furthermore, because the reception side DSP 33C can output, in units of channels, because the frequency components that have been subjected to the nonlinear compensation, there is no need to perform the process of restoring the shift of the center frequency of frequency components performed by the shift back unit 45A illustrated in FIG. 6.

Furthermore, on the basis of the signal information, the reception side DSP 33C in the fourth embodiment described above sets the number of reception channels M as the number of divisions N and sets the communication band of the reception channels as the division bandwidth Bdiv. However, it may also be possible to switch modes between a mode in which the number of divisions N and the division bandwidth Bdiv are set from the number of reception channels and the communication band of reception channels in the signal information and a mode in which the number of divisions N and the division bandwidth Bdiv are set from the minimum division bandwidth calculated from the FWM efficiency described in the third embodiment.

Furthermore, the reception side DSP 33C according to the fourth embodiment described above determines that the number of reception channels M is set as the number of divisions N, determines that the communication band of reception channels as the division bandwidth Bdiv, and sets the determined number of divisions N and the determined division bandwidth Bdiv in the dividing unit 41A. However, a management device that is not illustrated in the optical transmission system 1 may also determine the number of divisions N and the division bandwidth Bdiv and set the determined number of divisions N and the determined division bandwidth Bdiv in the dividing unit 41 in the optical receiver 3. An embodiment of this case will be described below as a fifth embodiment.

[e] Fifth Embodiment

Figure 8:
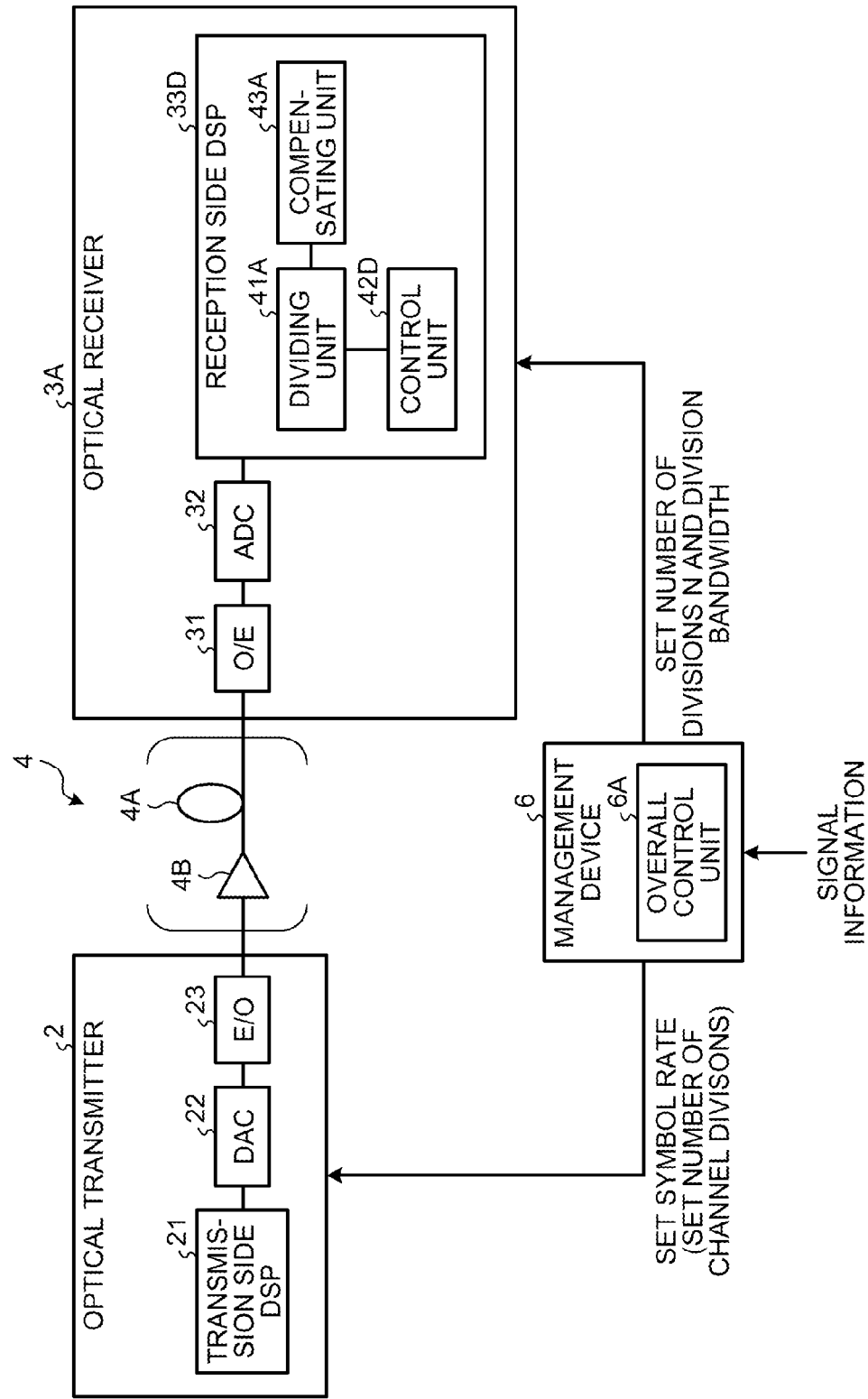
FIG. 8 is a block diagram illustrating an example of an optical transmission system according to a fifth embodiment.

FIG. 8 is a block diagram illustrating an example of an optical transmission system 1A according to a fifth embodiment. The optical transmission system 1A illustrated in FIG. 8 includes the optical transmitter 2, an optical receiver 3A, the optical transmission line 4 that connects the optical transmitter 2 and the optical receiver 3A, and a management device 6. By assigning the same reference numerals to components having the same configuration as those in the reception side DSP 33C illustrated in FIG. 7, descriptions thereof will be omitted.

The management device 6 is a device that manages the optical transmitter 2 and the optical receiver 3A in the optical transmission system 1A. The management device 6 includes an overall control unit 6A.

The overall control unit 6A acquires, from the signal information, the number of reception channels M and the communication band of reception channels. Furthermore, the overall control unit 6A determines that the acquired number of reception channels M is set as the number of divisions N and determines the communication band of the acquired reception channels is set as the division bandwidth Bdiv. Then, the overall control unit 6A sets the determined number of divisions N and the determined division bandwidth Bdiv in the dividing unit 41A in a reception side DSP 33D in the optical receiver 3. Namely, because a control unit 42D in the reception side DSP 33D does not need to perform the process, as a burden, of determining the number of divisions N and the division bandwidth Bdiv, the control unit 42D acquires the number of divisions N and the division bandwidth Bdiv from the overall control unit 6A and sets the acquired number of divisions N and the sets division bandwidth Bdiv in the dividing unit 41A.

Furthermore, for the transmission side DSP 21 in the optical transmitter 2, the overall control unit 6A sets the symbol rate of a transmission signal to the rate equal to or less than that of the division bandwidth. Furthermore, the number of transmission channels on the optical transmitter 2 side is made to the same as the number of divisions N.

In the following, an operation of the optical transmission system 1A according to the fifth embodiment will be described. The overall control unit 6A in the management device 6 in the optical transmission system 1A acquires the signal information and acquires, from the acquired signal information, the number of reception channels M and the communication band of the reception channels. The overall control unit 6A determines the acquired number of reception channels M as the number of divisions N, determines the communication band of the acquired reception channel as the division bandwidth Bdiv, and sets the determined number of divisions Na and the division bandwidth Bdiv in the dividing unit 41A in the reception side DSP 33D in the optical receiver 3A. Furthermore, in order to set the symbol rate of the transmission signals on the optical transmitter 2 side, the overall control unit 6A sets the division bandwidth Bdiv in the transmission side DSP 21 in the optical transmitter 2.

The transmission side DSP 21 in the optical transmitter 2 inputs, to the DAC 22, a transmission signal by using the set symbol rate. The DAC 22 performs analog conversion on the transmission signal and inputs the transmission signal subjected to the analog conversion to the E/O 23. The E/O 23 performs electric-optic conversion on the transmission signal and transmits the transmission signal subjected to the electric-optic conversion to the optical transmission line 4.

The O/E 31 in the optical receiver 3A performs electric conversion on the reception signal received by way of the optical transmission line 4 and inputs the reception signal subjected to the electric conversion to the ADC 32. The ADC 32 performs digital conversion on the reception signals and inputs the reception signals subjected to the digital conversion to the reception side DSP 33D. The dividing unit 41A in the reception side DSP 33D divides, on the basis of the set number of divisions N and the division bandwidth Bdiv, the reception signals into frequency components in units of channels and inputs each of the frequency components to the compensating unit 43A. The compensating unit 43A performs the compensating process of digital back propagation on frequency components for each channel. The compensating unit 43A performs the compensating process of the digital back propagation and outputs the compensated frequency components in units of channels.

The management device 6 according to the fifth embodiment determines that the number of reception channels M in the signal information is set as the number of divisions N, determines that the communication band of the channels in the signal information is set as the division bandwidth Bdiv, and sets the number of divisions N and the division bandwidth Bdiv in the dividing unit 41A in the reception side DSP 33D in the optical receiver 3A. Consequently, the reception side DSP 33D needs to only acquire the number of divisions N and the division bandwidth Bdiv from the management device 6; therefore, the processing load thereof can be reduced.

The reception side DSP 33D in the optical receiver 3 divides, on the basis of the set number of divisions N and the division bandwidth Bdiv, the reception signals into frequency components in units of channels and performs the compensating process of the digital back propagation on the divided frequency components. The compensating unit 43A performs the compensating process of the digital back propagation and outputs the compensated frequency components in units of channels. Consequently, because the amount of the wavelength dispersion of the frequency components in units of channels is decreased and the number of processing steps in the digital back propagation is accordingly reduced, the compensating unit 43A can suppress the size of the circuit.

Furthermore, the compensating unit 43A in the reception side DSP 33D according to the fifth embodiment described above performs the nonlinear compensation of the digital back propagation; however, the embodiment is not limited to the digital back propagation. For example, nonlinear compensation of perturbation equalization may also be performed. An embodiment of this case will be described below as a sixth embodiment.

[f] Sixth Embodiment

Figure 9:
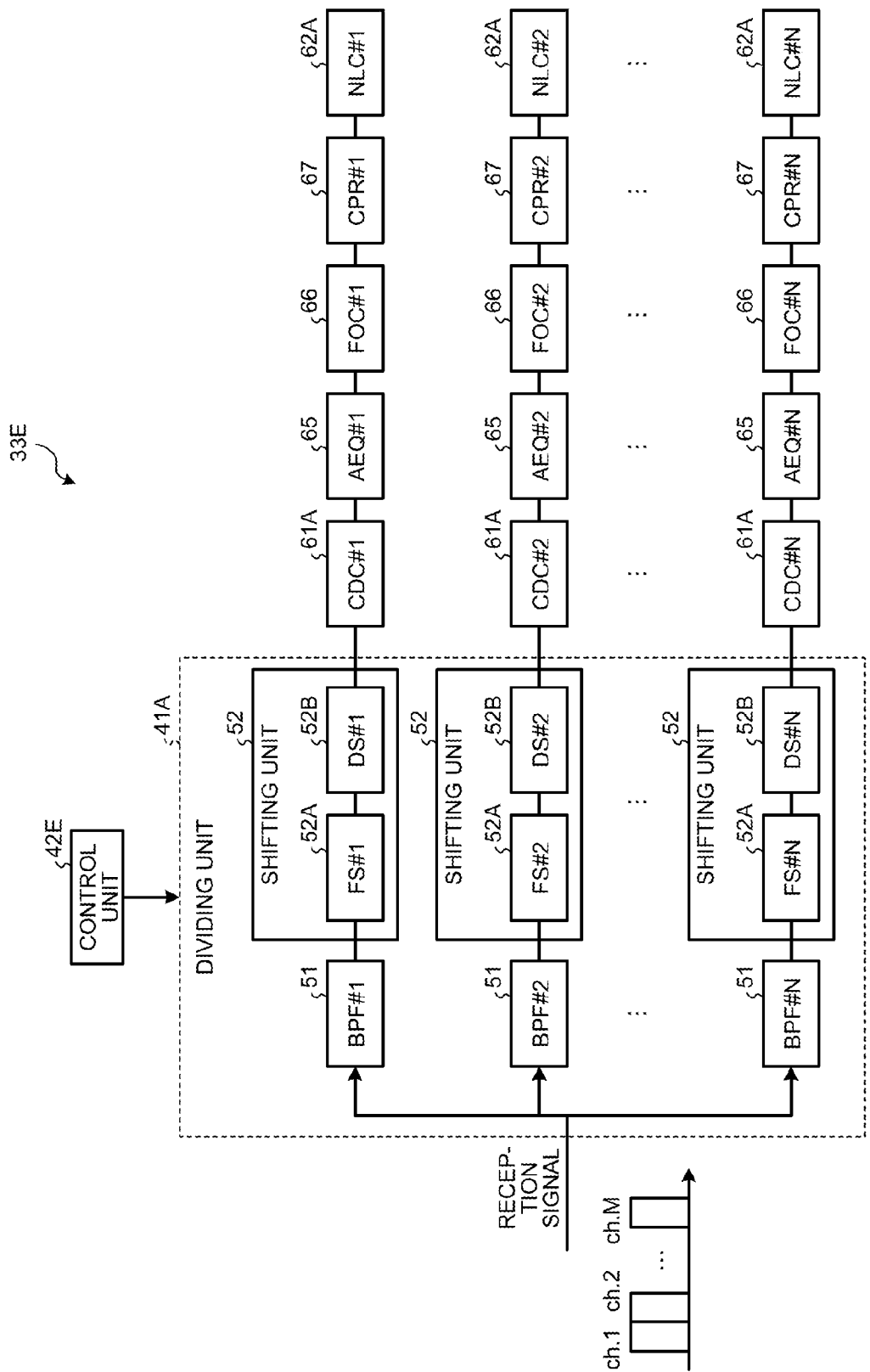
FIG. 9 is a block diagram illustrating an example of a reception side DSP according to a sixth embodiment.

FIG. 9 is a block diagram illustrating an example of a reception side DSP 33E according to a sixth embodiment. By assigning the same reference numerals to components having the same configuration as those in the reception side DSP 33C illustrated in FIG. 7, descriptions thereof will be omitted.

The reception side DSP 33E illustrated in FIG. 9 differs from the reception side DSP 33C illustrated in FIG. 7 in that perturbation equalization is used instead of digital back propagation. The reception side DSP 33E includes a dividing unit 41A, a control unit 42E, N (#1 to #N) CDCs 61A, N (#1 to #N) AEQs 65, N (#1 to #N) FOCs 66, N (#1 to #N) CPRs 67, and N (#1 to #N) NLCs 62A. The dividing unit 41A includes N (#1 to #N) BPFs 51 and N (#1 to #N) shifting units 52. The control unit 42E sets, in the dividing unit 41A, the number of divisions N and the division bandwidth Bdiv determined on the basis of the transmission path information or the signal information.

Each of the CDCs 61A is a wavelength dispersion compensating unit that compensates the wavelength dispersion of the frequency components received from the dividing unit 41A. Each of the AEQs 65 is an adaptive equalizer that performs, on the frequency components, for example, polarization division, compensation of residual dispersion, and compensation of a narrowed signal band. The FOC 66 is a frequency offset compensating unit that estimates an offset that is a difference with the frequency of, related to a frequency component, the light source on the optical transmitter 2 side and compensates the difference. The CPR 67 is a carrier phase restoring unit that compensates, on a frequency component, for example, phase noise of the light source or a variation component of a high-speed frequency offset that is not able to be compensated by the FOC 66. The NLC 62A is a nonlinear compensating unit that compensates nonlinear distortion on the frequency component compensated by the CPR 67.

In the following, an operation of the reception side DSP 33E according to the sixth embodiment will be described. The dividing unit 41A sets the center frequency and the passband of the frequency component to the BPF 51 for each frequency component associated with the number of divisions N and the division bandwidth Bdiv from the control unit 42E. The number of divisions N is set as the number of reception channels M and the division bandwidth Bdiv is set as the communication band of the reception channels.

Each of the BPFs 51 divides the reception signals into frequency components in units of channels. The FS 52A in the shifting unit 52 associated with the BPF 51 shifts the center frequency of the frequency components to 0 Hz. The DS 52B in the shifting unit 52 associated with the FS 52A performs a down sampling process that decimates the sampling rate of the frequency components that have been subjected to the frequency shift.

Furthermore, the CDC 61A associated with the DS 52B compensates the wavelength dispersion of the frequency components that have been subjected to the down sampling. The AEQ 65 performs, on the frequency components that have been subjected to the wavelength dispersion compensation, for example, polarization division, compensation of residual dispersion, and compensation of a narrowed signal band. Furthermore, the FOC 66 associated with the CDC 61A estimates a frequency offset that is a difference of, related to the frequency components subjected to adaptive processing performed by the AEQ 65, the frequency of the light source on the optical transmitter 2 side and compensates that frequency offset. Furthermore, the CPR 67 associated with the FOC 66 compensates, on the frequency components compensated by the FOC 66, for example, phase noise of the light source or the offset that was not able to be compensated by the FOC 66. Then, the NLC 62A associated with the CPR 67 compensates the nonlinear distortion on the frequency component compensated by the CPR 67 and outputs that frequency component to the signal processing unit associated with the channel.

The reception side DSP 33E according to the sixth embodiment divides a reception signal into frequency components in units of channels by the dividing unit 41A and compensates the divided frequency components by the CPR 67 and, then, the nonlinear distortion of the frequency components compensated by the CPR 67 is compensated by the NLC 62A. Namely, even if nonlinear compensation of perturbation equalization is performed, the reception side DSP 33E divides the reception signal into frequency components in units of channels. Consequently, the amount of the wavelength dispersion of the frequency components is decreased and the nonlinear compensation can be implemented by reducing the size of the circuit.

Figure 10:
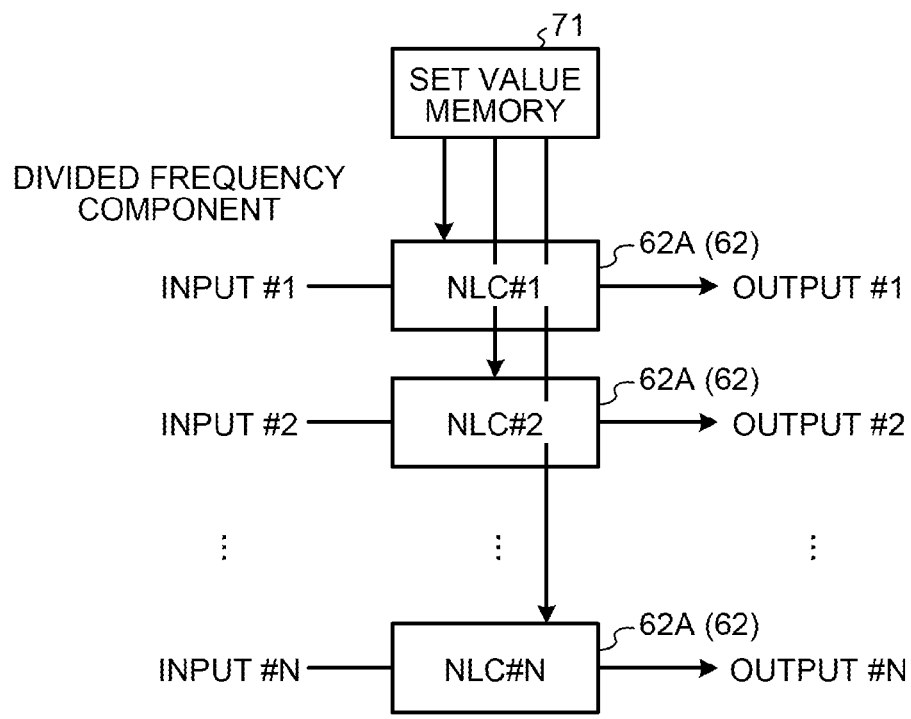
FIG. 10 is a diagram illustrating an example of an NLC setting method.
Figure 11:
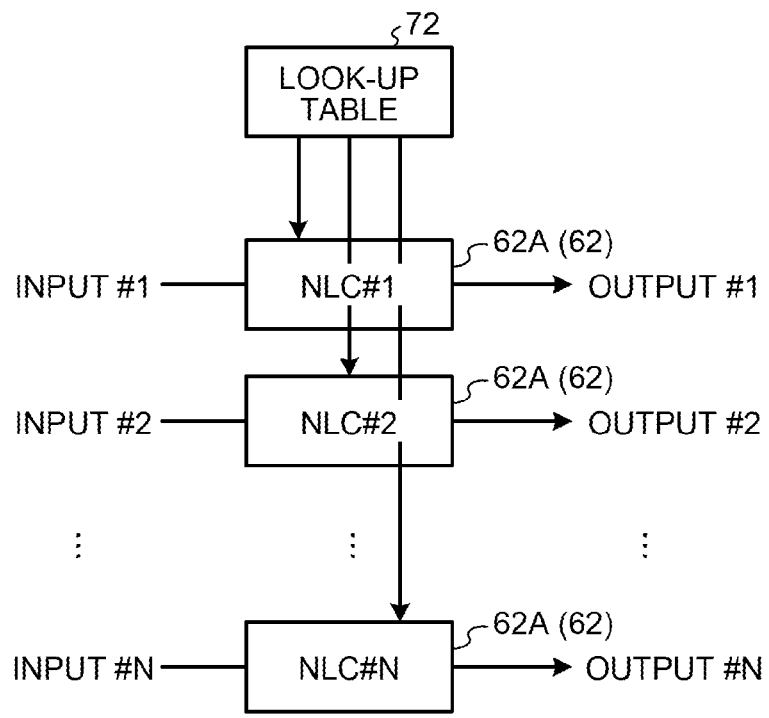
FIG. 11 is a diagram illustrating an example of the NLC setting method.
Figure 12:
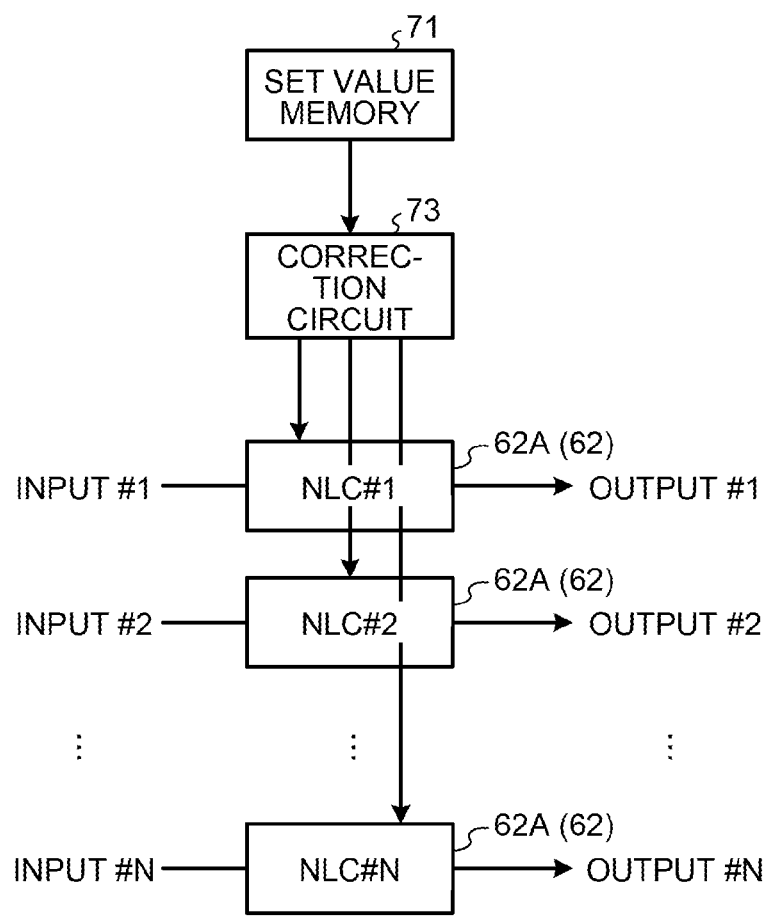
FIG. 12 is a diagram illustrating an example of the NLC setting method.

Furthermore, in the second to the sixth embodiments described above, because the NLC 62A (64) is provided for each frequency component that was divided by the dividing unit 41A, the number of the NLCs 62A (62) is increased and thus a process of setting a set value of the NLC 62A (62) is needed. Accordingly, a method of setting a set value to each of the NLCs 62A (62) will be described. FIGS. 10 to 12 are diagrams each illustrating an example of an NLC setting method.

In the setting method illustrated in FIG. 10, the reception side DSP 33 includes a set value memory 71 that stores therein set values each of which is set to each of the NLCs 62A (62). The control unit 42 in the reception side DSP 33 sets, in accordance with a set timing, the set values stored in the set value memory 71 to the NLCs 62A (62). Consequently, even if the number of NLCs 62A (64) is increased, it is possible to reduce the load applied to the NLC 62A (62) for setting the set values.

In the setting method illustrated in FIG. 11, the reception side DSP 33 includes a look-up table 72 that stores therein set values each of which is set to each of the NLCs 62A (62). The control unit 42 in the reception side DSP 33 sets, in accordance with a set timing, the set values stored in the look-up table 72 to the NLCs 62A (62). Consequently, even if the number of the NLCs 62A (62) is increased, it is possible to reduce the load applied to the NLCs 62A (62) for setting the set values.

In the setting method illustrated in FIG. 12, the reception side DSP 33 includes the set value memory 71 that stores therein set value each of which is set to each of the NLCs 62A (62) and a correction circuit 73 that corrects the set values. It is assumed that the set values stored in the set value memory 71 are common set values. The correction circuit 73 stores therein a coefficient that is used to obtain a set value that is set for each of the NLCs 62A (62) and then reads a coefficient associated with a frequency component that is to be subjected to nonlinear compensation in each of the NLCs 62A (62). Furthermore, the correction circuit 73 corrects, on the basis of the coefficient, the set value that is read from the set value memory 71 and then sets the corrected set value to the NLC 62A (62). Consequently, it is possible to provide optimum set values associated with the NLCs 62A (62).

Figure 13:
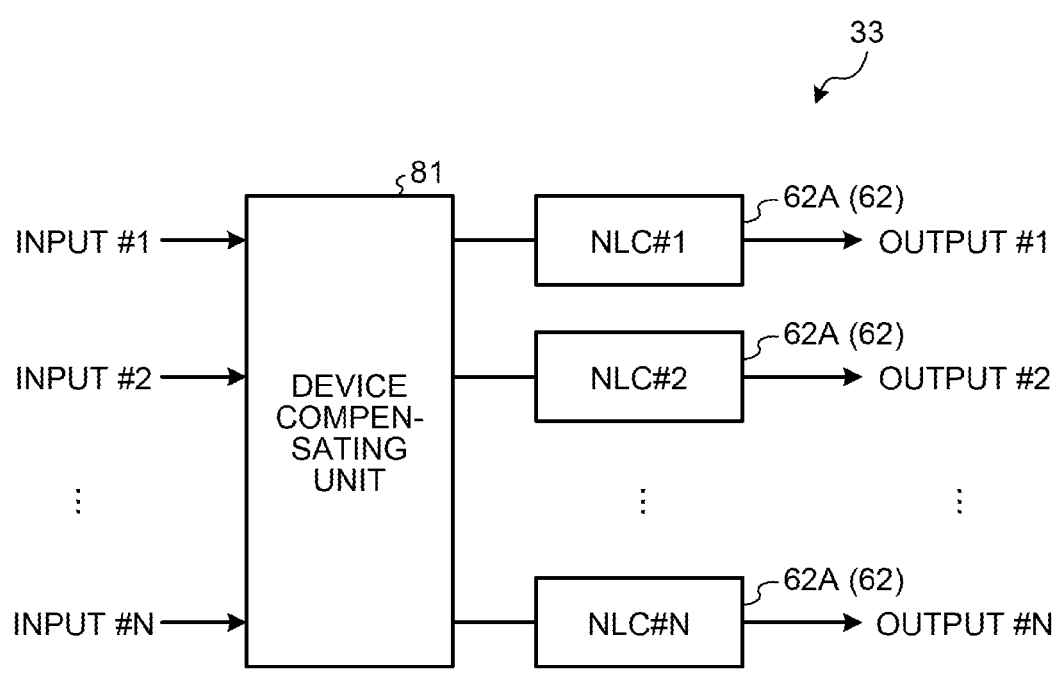
FIG. 13 is a block diagram illustrating an example of a reception side DSP.

Furthermore, in the first to the sixth embodiments described above, nonlinear distortion generated in the optical transmission line 4, such as the optical fiber 4A or the like, is compensated. However, in addition to the nonlinear distortion in the optical transmission line 4, nonlinear distortion is generated in an electronic device, such as the ADC 32, the DAC 22, the optical device 4B, or the like in the optical receiver 3 or the optical transmitter 2, or a device, such as an optical device including an optical modulator or the like. Accordingly, in order to compensate nonlinear distortion in these devices, a device compensating unit may also be disposed. FIG. 13 is a block diagram illustrating an example of the reception side DSP 33. A device compensating unit 81 inside the reception side DSP 33 illustrated in FIG. 13 is disposed upstream of each of the NLCs 62A (62) that compensates the nonlinear distortion of each of the divided frequency components in the optical transmission line 4.

The device compensating unit 81 inputs each of the divided frequency components and performs a device nonlinear compensating process in order to perform the nonlinear distortion of the input frequency components in the device. Then, the device compensating unit 81 outputs the frequency components subjected to the nonlinear compensation to the NLC 62A (62) that is associated with the target frequency component. Each of the NLCs 62A (62) performs the nonlinear compensating process and outputs the frequency components in order to compensate the nonlinear distortion of the frequency components in the optical transmission line 4.

Consequently, in the reception side DSP 33, in addition to the nonlinear distortion in the optical transmission line 4, the nonlinear distortion in the device is also compensated.

Figure 14:
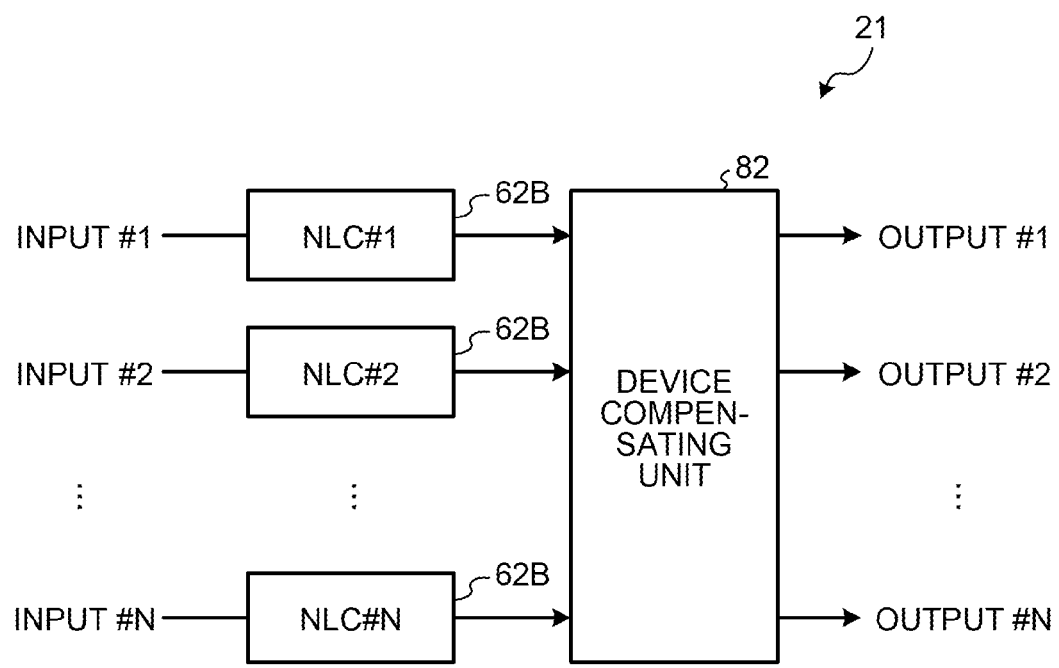
FIG. 14 is a block diagram illustrating an example of a transmission side DSP.
Figure 15:
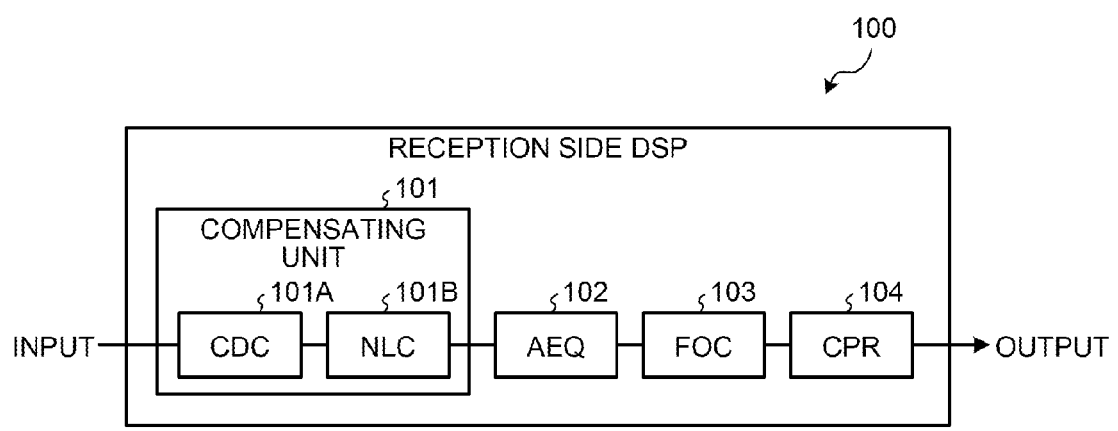
FIG. 15 is a block diagram illustrating an example of a reception side DSP in an optical receiver in an optical transmission device.

Furthermore, FIG. 14 is a block diagram illustrating an example of the transmission side DSP 21. A device compensating unit 82 inside the transmission side DSP 21 illustrated in FIG. 14 is disposed downstream of each of NLCs 62B that compensate the nonlinear distortion generated in the optical transmission line 4 for each of the divided frequency component.

The device compensating unit 82 inputs the frequency components that has been subjected to the nonlinear compensation by each of the NLC 62B and performs the device nonlinear compensating process in order to compensate the input nonlinear distortion, in the device, of the frequency components subjected to the nonlinear compensation. Then, the device compensating unit 82 outputs each of the frequency components that have been subjected to the nonlinear compensation.

Consequently, in addition to the nonlinear distortion in the optical transmission line 4, the transmission side DSP 21 can also compensate the nonlinear distortion in a device.

Furthermore, the reception side DSP 33A (33B) according to the second and the thirst embodiments described above includes a shifting unit 52 that performs a frequency shift that shifts the center frequency of the divided frequency components to 0 Hz and a shift back unit 45A that restores, to the original, the center frequency of the frequency components after the frequency has been shifted. However, the configuration is not limited to the configuration in which the shifting unit 52 and the shift back unit 45A are included. For example, the shifting unit 52 and the shift back unit 45A may not be disposed. Furthermore, the FS 52A and the US 63 may not be included and the DS 52B and the FS 64 may not be included.

Furthermore, in the first to the sixth embodiments described above, a description has been given of, as an example, the reception side DSP 33 or the like on the optical receiver 3 side; however, the embodiments may also be used for an pre-equalization circuit, in the transmission side DSP 21 on the optical transmitter 2 side, that performs nonlinear compensation on the transmission signals. Namely, when the transmission side DSP 21 outputs the transmission signals, the transmission side DSP 21 divides transmission signals into frequency components with N divisions on the basis of the number of divisions N and the division bandwidth Bdiv, performs the nonlinear compensating process on each of the divided frequency components, combines the frequency components that have been subjected to the nonlinear compensation, and outputs the combined frequency components as a transmission signal. Consequently, because the pre-equalization circuit in the transmission side DSP 21 divides the transmission signal and the amount of the wavelength dispersion of the divided frequency components is reduced, nonlinear compensation can be implemented while reducing the size of the circuit thereof.

In the second embodiment, the compensating unit 43A is disposed downstream of the dividing unit 41A; however, another processing block may also be disposed downstream of the dividing unit 41A and the compensating unit 43A may also be disposed downstream of this processing block.

The super channel method is used as the optical transmission system 1 according to the embodiments described above; however, the method is not limited to the super channel method and another transmission method that transmits optical signals may also be used.

Furthermore, the components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions.

Furthermore, all or any part of the processing functions performed by each unit may also be executed by a central processing unit (CPU) (or a microcomputer, such as a micro processing unit (MPU) or a micro controller unit (MCU)). Furthermore, all or any part of the processing functions may also be executed by programs analyzed and executed by the CPU (or the microcomputer, such as the MPU or the MCU) or executed by hardware by wired logic.

According to an aspect of an embodiment of the present invention, an advantage is provided in that nonlinear distortion can be compensated while the size of a circuit is reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
a dividing unit that divides an electrical transmission signal into a plurality of frequency components by a set number of frequency divisions and a set division bandwidth, the electrical transmission signal being a signal into which an optical transmission signal is converted;
a control unit that controls the number of frequency divisions and the division bandwidth on the basis of transmission path information about a transmission path through which the optical transmission signal is transmitted and signal information about the optical transmission signal; and
a compensating unit that compensates optical nonlinear distortion of each of the frequency components divided by the dividing unit.

2. The optical transmission device according to claim 1, wherein the control unit calculates an FWM efficiency of the transmission path on the basis of the transmission path information, acquires a reception bandwidth of the electrical transmission signal on the basis of the signal information, and controls the number of frequency divisions and the division bandwidth on the basis of the FWM efficiency and the reception bandwidth.

3. The optical transmission device according to claim 1, wherein the control unit controls the number of frequency divisions and the division bandwidth such that the electrical transmission signal is divided in units of reception channels on the basis of a reception bandwidth, the number of reception channels, and a frequency interval of a channel in the signal information.

4. The optical transmission device according to claim 1, further comprising:
a transmission side dividing unit that divides a transmission side electrical transmission signal to be transmitted into a plurality of frequency components by a set number of frequency divisions and a set division bandwidth, the transmission side electrical transmission signal being a signal that is converted into a transmission side optical transmission signal to be transmitted;
a transmission side control unit that controls, on the basis of transmission path information about a transmission path through which the transmission side optical transmission signal is transmitted and signal information about the transmission side optical transmission signal, the number of frequency divisions and the division bandwidth that are set in the transmission side dividing unit; and
a pre-equalization unit that pre equalizes optical nonlinear distortion of each of the frequency components divided by the transmission side dividing unit.

5. A nonlinear distortion compensation method causing an optical transmission device to execute a process comprising:
dividing an electrical transmission signal into a plurality of frequency components by a set number of frequency divisions and a set division bandwidth, the electrical transmission signal being a signal into which an optical transmission signal is converted;
controlling the number of frequency divisions and the division bandwidth on the basis of transmission path information about a transmission path through which the optical transmission signal is transmitted and signal information about the optical transmission signal; and
compensating optical nonlinear distortion of each of the divided frequency components.

6. The nonlinear distortion compensation method according to claim 5, the process further comprising:
dividing a transmission side electrical transmission signal to be transmitted into a plurality of frequency components by a set number of frequency divisions and a set division bandwidth, the transmission side electrical transmission signal being a signal that is converted into a transmission side optical transmission signal to be transmitted;
controlling, on the basis of transmission path information about a transmission path through which the transmission side optical transmission signal is transmitted and signal information about the transmission side optical transmission signal, the number of frequency divisions and the division bandwidth that are set when the transmission side electrical transmission signal to be transmitted are divided; and
pre equalizing optical nonlinear distortion of each of the divided frequency components.

7. An optical transmission device comprising:
a dividing unit that divides an electrical transmission signal into a plurality of frequency components by a set number of frequency divisions and a set division bandwidth, the electrical transmission signal being a signal that is converted into an optical transmission signal to be transmitted;
a control unit that controls, on the basis of transmission path information about a transmission path through which the optical transmission signal is transmitted and signal information about the optical transmission signal, the number of frequency divisions, and the division bandwidth; and
a pre-equalization unit that pre equalizes optical nonlinear distortion of each of the frequency components divided by the dividing unit.

8. The optical transmission device according to claim 7, wherein the control unit calculates an FWM efficiency of the transmission path on the basis of the transmission path information, acquires a transmission bandwidth of the electrical transmission signal on the basis of the signal information, and controls the number of frequency divisions and the division bandwidth on the basis of the FWM efficiency and the transmission bandwidth.

9. The optical transmission device according to claim 7, wherein the control unit controls the number of frequency divisions and the division bandwidth such that the electrical transmission signal is divided in units of transmission channels on the basis of a transmission bandwidth, the number of transmission channels, and a frequency interval of a channel in the signal information.

* * * * *